United States Patent
Liu et al.

(10) Patent No.: US 11,467,066 B2
(45) Date of Patent: Oct. 11, 2022

(54) METHOD FOR DETERMINING THE PRELOAD VALUE OF THE SCREW BASED ON THERMAL ERROR AND TEMPERATURE RISE WEIGHTING

(71) Applicant: Dalian University of Technology, Dalian (CN)

(72) Inventors: Kuo Liu, Dalian (CN); Yongqing Wang, Dalian (CN); Haibo Liu, Dalian (CN); Xu Li, Dalian (CN); Mingrui Shen, Dalian (CN); Mengmeng Niu, Dalian (CN); Ziyou Ban, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 785 days.

(21) Appl. No.: 16/470,925

(22) PCT Filed: Feb. 21, 2019

(86) PCT No.: PCT/CN2019/075710
§ 371 (c)(1),
(2) Date: Jun. 18, 2019

(87) PCT Pub. No.: WO2020/155226
PCT Pub. Date: Aug. 6, 2020

(65) Prior Publication Data
US 2020/0249130 A1    Aug. 6, 2020

(51) Int. Cl.
*G01M 99/00*    (2011.01)
*F16C 25/06*    (2006.01)

(52) U.S. Cl.
CPC ........... *G01M 99/002* (2013.01); *F16C 25/06* (2013.01); *G01M 99/007* (2013.01); *F16C 2229/00* (2013.01)

(58) Field of Classification Search
CPC ............. G01L 5/24; G01N 2003/0208; G01M 13/027; G01M 99/002; G01B 19/404; G01B 19/402; G01B 2219/49213
See application file for complete search history.

(56) References Cited

U.S. PATENT DOCUMENTS 4,657,412 A * 4/1987 McLarty ................ F16C 25/06
384/624
5,559,413 A * 9/1996 Seto ..................... G05B 19/231
318/568.18
(Continued)

FOREIGN PATENT DOCUMENTS

CN    104483896 A    4/2015
CN    107255530 A    10/2017
(Continued)

OTHER PUBLICATIONS

Search Report and Written Opinion dated Jan. 31, 2019, in International Application No. PCT/CN2019/075710.

*Primary Examiner* — Tran M. Tran
(74) *Attorney, Agent, or Firm* — Muncy, Geissler, Olds & Lowe, P.C.

(57) ABSTRACT

A method for determining the preload value of the screw based on thermal error and temperature rise weighting. Firstly, thermal behavior test of the feed shaft under typical working conditions is carried out to obtain the maximum thermal error and the temperature rise at the key measuring points in each preloaded state. Then, a mathematical model of the preload value of the screw and the maximum thermal error is established; meanwhile, another mathematical model of the preload value of the screw and the temperature rise at the key measuring points is also established. Finally, the optimal preload value of the screw is obtained. The thermal error of the feed shaft and the temperature rise of the moving components are comprehensively considered,
(Continued)

improving the processing accuracy and accuracy stability of the machine tool, and ensuring the service life of the moving components such as bearings.

1 Claim, 2 Drawing Sheets

(56) References Cited

U.S. PATENT DOCUMENTS

| | | | | |
|---|---|---|---|---|
| 5,564,840 A * | 10/1996 | Jurras, III | ............. | F16C 25/083 384/1 |
| 5,619,414 A * | 4/1997 | Ishii | ..................... | G05B 19/404 700/193 |
| 6,019,506 A * | 2/2000 | Senda | ..................... | G01B 21/32 374/55 |
| 6,286,374 B1 * | 9/2001 | Kudo | .................. | G01M 13/045 73/581 |
| 6,456,896 B1 * | 9/2002 | Ito | ........................ | G05B 19/404 700/192 |
| 6,546,781 B1 * | 4/2003 | Deegan | ................ | G01N 29/045 73/659 |
| 6,651,019 B2 * | 11/2003 | Mizuguchi | ............. | B23Q 15/18 700/192 |
| 6,810,747 B2 * | 11/2004 | Engler | ..................... | G01L 5/24 73/761 |
| 7,266,903 B2 * | 9/2007 | Sato | ..................... | G05B 19/404 700/193 |
| 7,354,386 B2 * | 4/2008 | Lefuji | .................... | B23Q 3/155 483/1 |
| 7,676,338 B2 * | 3/2010 | Sato | ........................ | G01K 15/00 702/100 |
| 7,766,541 B2 * | 8/2010 | Sato | ..................... | G01K 15/007 374/112 |
| 7,778,725 B2 * | 8/2010 | Senda | .................... | B23Q 15/18 700/174 |
| 8,255,075 B2 * | 8/2012 | Ou | ........................ | G05B 19/404 374/45 |
| 8,469,597 B2 * | 6/2013 | Smith | ................... | F16C 19/163 384/519 |
| 8,666,534 B2 * | 3/2014 | Besuchet | ........... | B23Q 11/0007 700/193 |
| 8,924,003 B2 * | 12/2014 | Maekawa | ............ | G05B 19/404 700/193 |
| 9,092,025 B2 * | 7/2015 | Maekawa | .......... | B23Q 11/0007 |
| 9,266,209 B2 * | 2/2016 | Murahashi | ......... | B23Q 11/0007 |
| 9,317,028 B2 * | 4/2016 | Sakai | ................... | G05B 19/404 |
| 9,593,987 B2 * | 3/2017 | Tsai | ....................... | G01K 13/08 |
| 9,811,073 B2 * | 11/2017 | Nishimura | ........... | G05B 19/404 |
| 10,025,290 B2 * | 7/2018 | Takeno | ................. | G05B 19/404 |
| 10,401,829 B2 * | 9/2019 | Maekawa | .......... | G05B 19/4155 |
| 10,514,676 B2 * | 12/2019 | Qi | ........................ | G05B 19/404 |
| 10,914,368 B2 * | 2/2021 | Chen | ................... | F16H 25/2204 |
| 11,009,857 B2 * | 5/2021 | Liu | ...................... | G05B 19/4184 |
| 11,268,608 B2 * | 3/2022 | Lin | ...................... | F16H 25/2015 |
| 11,287,795 B2 * | 3/2022 | Liu | ...................... | G05B 19/404 |
| 2012/0165971 A1 * | 6/2012 | Murahashi | ......... | B23Q 11/0007 700/175 |
| 2012/0296578 A1 * | 11/2012 | Redin | ....................... | G01L 5/24 702/158 |
| 2013/0238101 A1 * | 9/2013 | Kuramoto | ............. | G05B 11/01 702/41 |
| 2022/0042583 A1 * | 2/2022 | Kubota | ............... | F16H 25/2204 |

FOREIGN PATENT DOCUMENTS

| | | |
|---|---|---|
| CN | 107420504 A | 12/2017 |
| CN | 108637770 A | 10/2018 |

* cited by examiner

METHOD FOR DETERMINING THE PRELOAD VALUE OF THE SCREW BASED ON THERMAL ERROR AND TEMPERATURE RISE WEIGHTING

TECHNICAL FIELD

The invention belongs to the technical field of CNC machine tool assembly, and it is specifically a method for determining the preload value of the screw based on thermal error and temperature rise weighting.

BACKGROUND

During the operation of the feed shaft, the friction between the nut and the screw generates a large amount of heat, which is transferred to the screw and causes thermal expansion of the screw. If the feed shaft adopts a semi-closed-loop control mode, the thermal expansion of the screw will cause a change in the positioning accuracy of the shaft. This change corresponds to the thermal error of the feed shaft. This thermal error will ultimately affect the machining accuracy of the workpieces and the accuracy and consistency of the batches being processed.

A common method that is used in order to reduce the thermal error of the semi-closed-loop feed shaft is to preload the screw, that is, an axial preload force is applied to the screw by the preload nut, so that the screw undergoes the appropriate amount of axial pre-stretching. The larger the preload angle of the preload nut that is applied, the larger the pre-stretching amount of the screw. When the screw is heated, the internal stress generated by the pre-stretching of the screw will be first offset without elongation. When the internal stress is completely offset, the screw will extend as the result of the heating. This will effectively reduce the thermal error of the feed shaft.

The current method of reducing the thermal error of the feed shaft by preloading the screw has the following disadvantages: the preload value of the screw is generally determined based on experience and mainly takes the suppression effect on the thermal error into consideration, which makes it difficult to achieve the optimal effect. If the preload value of the screw is too small, the suppressing effect on the thermal error is insufficient; if the preload value of the screw is too large, although the suppressing effect on the thermal error is good, the temperature rise of both the front and rear bearings of the screw will be excessively large, which will accelerate bearing wear and shorten its service life. In the patent "EXPERIMENTAL OPTIMIZATION METHOD FOR BALL SCREW PRE-TIGHTENING FORCE OF CNC MACHINE TOOL FEED SYSTEM" (application no. 201610285987.5), Li et al. proposed an optimization method for the preload force of the screw with the positioning accuracy and dynamic characteristics of the feed shaft, but the influence of the preload force of the screw on the thermal error and the temperature rise of both the front and rear bearings was not considered. Therefore, the optimal preload force of the screw obtained by this method cannot meet the common requirements of suppressing the thermal error and providing control over the temperature rise.

SUMMARY OF THE INVENTION

A method for determining the preload value of the screw based on the thermal error and temperature rise weighting is proposed in this invention, aiming at the current situation where there is no method to determine the optimal preload value that comprehensively considers the thermal error and temperature rise. The optimal preload value of the screw is obtained by comprehensively considering the suppression of the thermal error of the feed shaft and the control over the temperature rise at the key measuring points.

The Technical Solution of the Present Invention

Based on the method for determining the preload value of the screw with thermal error and temperature rise weighting, firstly, under the different preload states of the screw, a thermal behavior test of the feed shaft under typical working conditions is carried out to obtain the maximum thermal error and the temperature rise at the key measuring points in each preload state. Then, a mathematical model of the preload values of the screw and the maximum thermal error is established and, meanwhile, another mathematical model of the preload values of the screw and the temperature rise at the key measuring points is also established. Finally, the optimal preload value of the screw is obtained by optimizing the weighting function of the maximum thermal error and the temperature rise at each measuring point as the objective function. The specific steps are as follows:

The first step is the thermal behavior test of the feed shaft under typical working conditions.

The first temperature sensor 3 is located on the front bearing 2 of the feed system, the second temperature sensor 7 is located on the nut 6, the third temperature sensor 10 is located on the rear bearing 11 of the feed system, and the fourth temperature sensor 9 is located on the bed 8 near the screw.

The motion trajectory of the machine tool is analyzed when machining the workpieces, and the motion information of the feed shaft is extracted, including the travel range, feed speed and running frequency.

In the different preload states of the screw, the preload value of the screw is measured by the preload angle of the preload nut 12, and the thermal behavior test of the feed shaft is performed: In the initial thermal steady state, the full-range positioning error of the feed shaft is measured by a laser interferometer, and the temperature value of the first temperature sensor 3, the second temperature sensor 7, the third temperature sensor 10 and the fourth temperature sensor 9 are recorded. The feed shaft is heated under the motion information, and the positioning error of the whole journey is tested regularly (about every 15 minutes), and the temperature of each measuring point is recorded. The heating engine process and the testing process are repeated until the screw reaches thermal balance.

The second step is to calculate the maximum thermal error of the feed shaft and the temperature rise at the key measuring points.

Based on the thermal error and the temperature data collected in the first step, the maximum thermal error of the feed shaft is calculated according to equation (1) for each preload condition:

$$E_{max\_i} = E_i(M_i,N) - E_i(1,N) \tag{1}$$

where: $E_{max\_i}$ is the maximum thermal error when the ith preload value is used. $M_i$ is the number of positioning error tests when the ith preload value is used. N is the number of points for the positioning error test. $E_i(M_i,N)$ is the Nth point data of the $M_i$th positioning error test when the value is used. $E_i(1,N)$ is the Nth point data of the first positioning error test when the ith preload value is used;

The temperature rise of each measuring point under each preload value is calculated according to equation (2):

$$\Delta T_{i,j} = [T_{i,j}(M_i) - T_{i,j}(1)] - [T_{i,4}(M_i) - T_{i,4}(1)] \tag{2}$$

where: $\Delta T_{i,j}$ is the temperature rise of the jth temperature sensor when the ith preload value is used. $T_{i,j}(M_i)$ is the $M_i$th measurement value of the jth temperature sensor when the ith preload value is used. $T_{i,j}(1)$ is the first measurement value of the jth temperature sensor when the ith preload value is used. $T_{i,4}(M_i)$ is the $M_i$th measurement value of the fourth temperature sensor 9 when the ith preload value is used, and $T_{i,4}(1)$ is the first measurement value of the fourth temperature sensor 9 when the ith preload value is used.

The third step is to establish a mathematical model of the preload values of the screw and the maximum thermal error and another mathematical model of the preload values of the screw and the temperature rise at the key measuring points.

The relationship between the preload value of the screw and the maximum thermal error of the feed shaft is as shown in equation (3):

$$E_{max} = a_0 - a_1 \times A \quad (3)$$

where: $E_{max}$ is the maximum thermal error of the feed shaft, A is the preload value of the screw, that is, the locking angle of the preload nut 12, and $a_0$ and $a_1$ are coefficients.

The mathematical model of the preload values of the screw and the temperature rise of the jth temperature sensor is shown in equation (4):

$$\Delta T_j = b_{j,0} + b_{j,1} \times e^{(b_{j,2} \times A)} \quad (4)$$

where: $\Delta T_j$ is the temperature rise of the jth temperature sensor, and $b_{j,0}$, $b_{j,1}$ and $b_{j,2}$ are coefficients.

According to the maximum thermal error and temperature rise data of the screw under the different preload values obtained in the second step, the coefficients $a_0$, $a_1$, $b_{j,0}$, $b_{j,1}$ and $b_{j,2}$ in formula (3) and formula (4) are identified by the least squares method.

The fourth step is to calculate the optimal preload value of the screw.

The weighted functions of the maximum thermal error and temperature rise at key measuring points are shown in equation (5):

$$F(E_{max}, \Delta T_j) = \lambda_0 \times E_{max} + \sum_{j=1}^{3} \lambda_j \Delta T_j \quad (5)$$

where: $\lambda_0$ is the weight coefficient of the maximum thermal error of the feed shaft, and $\lambda_j$ is the weight coefficient of the temperature rise of the jth temperature sensor;

Rewriting equation (5) according to equations (3) and (4) gives:

$$F(A) = \lambda_0 \times (a_0 - a_1 \times A) + \sum_{j=1}^{3} \lambda_j \left(b_{j,0} + b_{j,1} \times e^{(b_{j,2} \times A)}\right) \quad (6)$$

Through automatic optimization based on equation (7), the optimal preload value of the screw can be obtained;

$$\min[F(A)] = \min\left[\lambda_0 \times (a_0 - a_1 \times A) + \sum_{j=1}^{3} \lambda_j \left(b_{j,0} + b_{j,1} \times e^{(b_{j,2} \times A)}\right)\right] \quad (7)$$

$$A_{min} \leq A \leq A_{max}$$

where: $A_{min}$ and $A_{max}$ are the lower and upper limits of the preload value A of the screw respectively in the automatic optimization process.

The beneficial effect of the present invention is that the thermal error of the feed shaft and the temperature rise of the moving components are comprehensively considered, and the optimal preload value of the screw is obtained through the thermal behavior test of the feed shaft and the preload calculation under typical working conditions, thus solving the problem that the current experience-based method for determining the preload value of the screw is difficult to achieve the optimal effect. According to the method for determining the preload value of the screw, the invention can effectively reduce the thermal error of the feed shaft and control the temperature rise of the moving components such as bearings, thus improving the processing accuracy and stability of the machine tool, and ensuring the service life of the moving components such as bearings.

DRAWINGS

Figure 1:
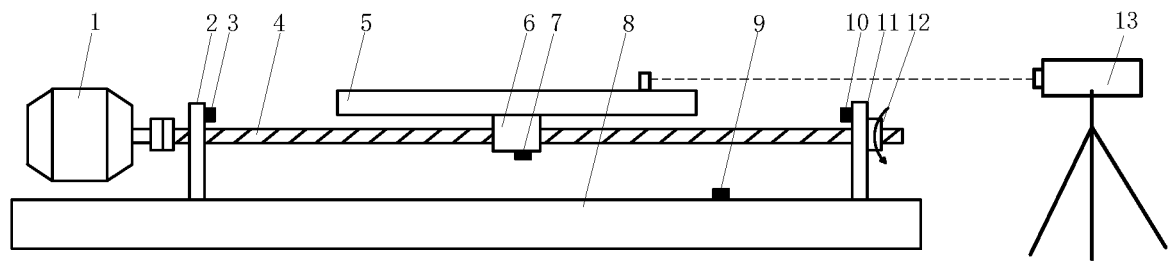
FIG. 1 shows a schematic diagram of the location of the temperature measuring points of the feed shaft.

In the figures: 1 feed shaft motor; 2 front bearings of the screw; 3 the first temperature sensor; 4 screw; 5 work table; 6 nut; 7 the second temperature sensor; 8 bed; 9 the fourth temperature sensor; 10 the third temperature sensor; 11 rear bearings; 12 preload nuts; 13 a laser interferometer.

DETAILED DESCRIPTION

In order to make the objects, technical solutions, and the advantages of the present invention clearer, the present invention is described in detail with reference to the accompanying drawings.

The embodiment of the present invention is described in detail, taking the X-axis of a vertical machining center as an example. The machining center has an X-axis travel range of 0~-500 mm and the maximum feed speed is 32000 mm/min.

The first step is the thermal behavior test of the feed shaft under typical working conditions.

The first temperature sensor 3 is located on the front bearing 2 of the feed system, the second temperature sensor 7 is located on the nut 6, the third temperature sensor 10 is located on the rear bearing 11 of the feed system, and the fourth temperature sensor 9 is located on the bed 8 near the screw.

The measured machining center is oriented towards the consumer electronics industry. The typical workpieces processed are aluminum casings for mobile phones and tablet computers. The typical working conditions are determined according to the processing process: the common travel range is −100~−400 mm; the common feed speed is 2000 mm/min; the average machining time of a single workpiece is 90 s, and the machining interval of the workpieces is 15 s.

The thermal behavior test of the feed shaft is carried out respectively under the conditions that the preload nuts have locking angles of 0°, 60°, 120°, 180° and 270°:

In the initial thermal steady state of the feed shaft, the full-range positioning error of the feed shaft is tested by a laser interferometer, and the temperature values from the first temperature sensor 3, the second temperature sensor 7, the third temperature sensor 10, and the fourth temperature sensor 9 are recorded. Then, the feed shaft is heated under typical motion information. The heating engine program is shown in Table 1.

TABLE 1

| CNC program for heating engine | |
| --- | --- |
| AAA: | G4F1 |
| BBB: | REPEAT BBBP = 14 |
| G90 G1 X-400 F2000 | G4F15 |
| G4F1 | goto AAA |
| X-100 | M30 |
| Down to the second column | Finished |

The full-range positioning error is tested every 15 minutes during the movement, and the temperature values of the first temperature sensor 3, the second temperature sensor 7, the third temperature sensor 10, and the fourth temperature sensor 9 are recorded. The heating engine process is run for 2 hours, when the feed shaft reaches thermal balance, the test is stopped.

The second step is to calculate the maximum thermal error of the feed shaft and the temperature rise at the key measuring points.

Based on the thermal error and the temperature data collected in the first step, the maximum thermal error of the feed shaft in each preload condition is calculated according to equation (1):

$$E_{max\_i}=E_i(M_i,N)-E_i(1,N) \tag{1}$$

where: $E_{max\_i}$ is the maximum thermal error when the ith preload value is used. $M_i$ is the number of positioning error tests when the ith preload value is used, and N is the number of points for the positioning error test. $E_i(M_i,N)$ is the Nth point data of the $M_i$th positioning error test when the ith preload value is used. $E_i(1,N)$ is the Nth point data of the first positioning error test when the ith preload value is used.

The temperature rise for each measuring point under each preload value is calculated according to equation (2):

$$\Delta T_{i,j}=[T_{i,j}(M_i)-T_{i,j}(1)]-[T_{i,4}(M_i)-T_{i,4}(1)] \tag{2}$$

where: $\Delta T_{i,j}$ is the temperature rise of the jth temperature sensor when the ith preload value is used. $T_{i,j}(M_i)$ is the $M_i$th measurement value of the jth temperature sensor when the ith preload value is used. $T_{i,j}(1)$ is the first measurement value of the jth temperature sensor when the ith preload value is used. $T_{i,4}(M_i)$ is the $M_i$th measurement value of the fourth temperature sensor 9 when the ith preload value is used. $T_{i,4}(1)$ is the first measurement value of the fourth temperature sensor 9 when the ith preload value is used.

According to equation (1) and equation (2), the maximum thermal error and the temperature rise of each measuring point under each preload value of the screw are then calculated. The specific results are shown in Table 2.

TABLE 2

Summary of the Maximum Thermal Error and Temperature Rise Data

| Preload value/° | Maximum thermal error/μm | Temperature rise of the first temperature sensor/° C. | Temperature rise of the second temperature sensor/° C. | Temperature rise of the third temperature sensor/° C. |
| --- | --- | --- | --- | --- |
| 0 | 29.6 | 3.24 | 2.89 | 2.76 |
| 60 | 27.2 | 3.35 | 2.97 | 2.98 |
| 120 | 20.6 | 3.47 | 3.11 | 3.36 |
| 180 | 13.5 | 4.01 | 2.94 | 3.97 |
| 270 | 8.8 | 5.23 | 3.05 | 4.98 |

The third step is to establish one mathematical model of the preload values of the screw and the maximum thermal error and another mathematical model of the preload values of the screw and the temperature rise at the key measuring points.

The relationship between the preload value of the screw and the maximum thermal error of the feed shaft is as shown in equation (3):

$$E_{max}=a_0-a_1 \times A \tag{3}$$

where: $E_{max}$ is the maximum thermal error of the feed shaft, A is the preload value of the screw (i.e., the locking angle of the preload nut 12), and $a_0$ and $a_1$ are coefficients.

The mathematical model of the preload values of the screw and the temperature rise of the jth temperature sensor is shown in equation (4):

$$\Delta T_j=b_{j,0}+b_{j,1} \times e^{(b_{j,2} \times A)} \tag{4}$$

where: $\Delta T_j$ is the temperature rise of the jth temperature sensor, $b_{j,0}$, $b_{j,1}$ and $b_{j,2}$ are coefficients.

Figure 2:
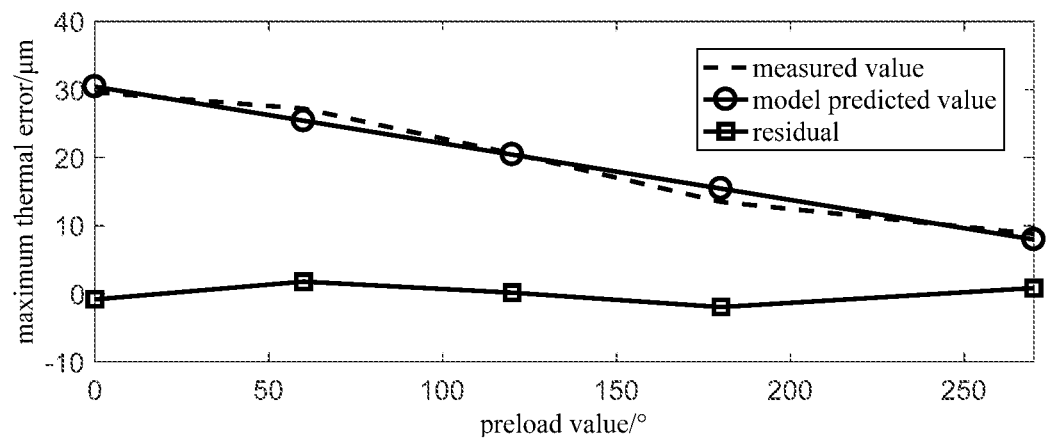
FIG. 2 shows the effect of modeling the maximum thermal error.
Figure 3A:
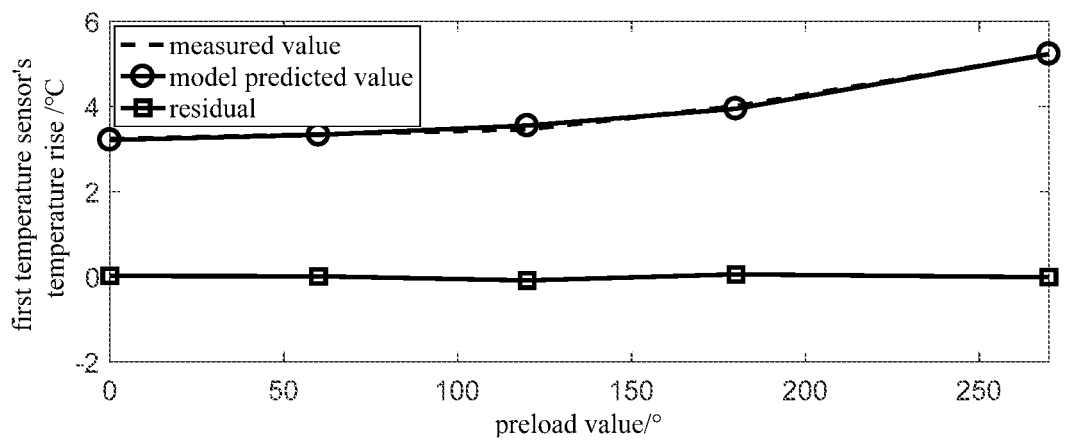
FIG. 3(a) shows the effect of modeling the temperature rise of the first temperature sensor.
Figure 3B:
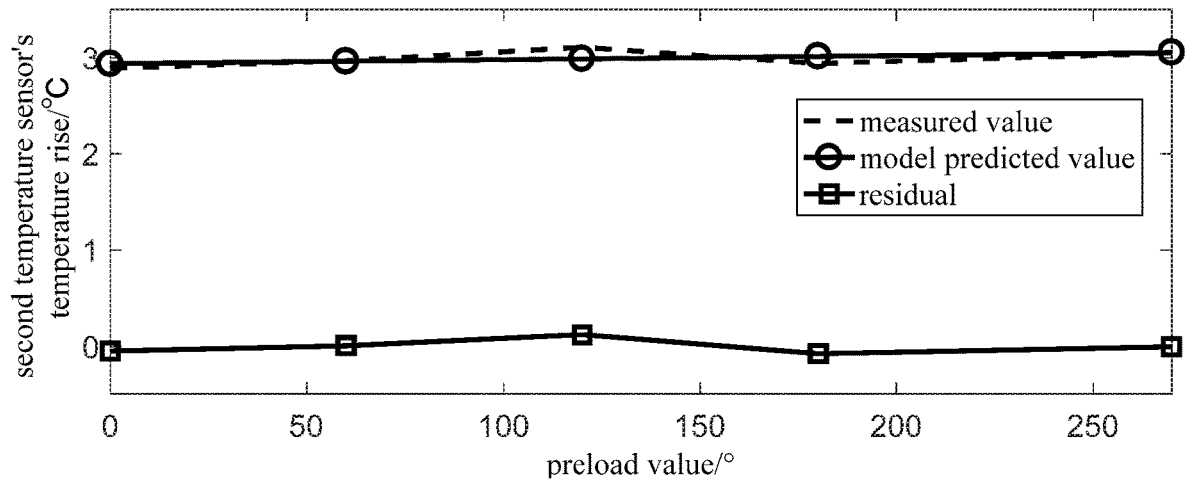
FIG. 3(b) shows the effect of modeling the temperature rise of the second temperature sensor.
Figure 3C:
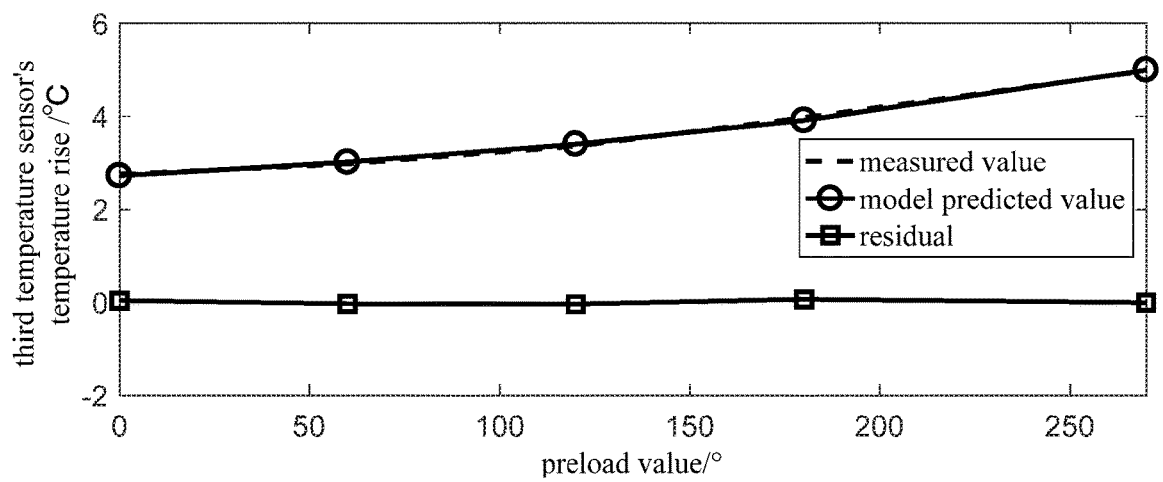
FIG. 3(c) shows the effect of modeling the temperature rise of the third temperature sensor.

According to the maximum thermal error and the temperature rise data, under the different preload values of the screw obtained in the second step, and based on the least squares method, the coefficients in the model can be obtained according to equation (3) and equation (4). The coefficients are as follows: $a_0$=30.418, $a_1$=0.083, $b_{1,0}$=3.073, $b_{1,1}$=0.15, $b_{1,2}$=0.010, $b_{2,0}$=0.718, $b_{2,1}$=2.220, $b_2$=0.0002, $b_{3,0}$=1.814, $b_{3,1}$=0.912 and $b_3$=0.005. The effect of modeling the maximum thermal error is shown in FIG. 2, and the effect of modeling the temperature rise of the first to the third temperature sensors is shown in FIG. 3(a)–FIG. 3(c).

The fourth step is to calculate the optimal preload value of the screw.

The weighting function of the maximum thermal error and the temperature rise at the key measuring points is shown in equation (5):

$$F(E_{max}, \Delta T_j) = \lambda_0 \times E_{max} + \sum_{j=1}^{3} \lambda_j \Delta T_j \tag{5}$$

where: $\lambda_0$ is the weight coefficient of the maximum thermal error of the feed shaft, and $\lambda_j$ is the weight coefficient of the temperature rise of the jth temperature sensor.

Rewriting equation (5) according to equations (3) and (4) gives:

$$F(A) = \lambda_0 \times (a_0 - a_1 \times A) + \sum_{j=1}^{3} \lambda_j \left(b_{j,0} + b_{j,1} \times e^{(b_{j,2} \times A)}\right) \tag{6}$$

Considering the suppression effect on the thermal error and the control over the temperature rise, the weight coefficients in the equation (6) are set as: $\lambda_0=0.15$, $\lambda_1=0.8$, $\lambda_2=0.1$, and $\lambda_3=0.8$.

Then automatic optimization is carried out based on equation (7):

$$\min[F(A)] = \min\left[\lambda_0 \times (a_0 - a_1 \times A) + \sum_{j=1}^{3} \lambda_j \left(b_{j,0} + b_{j,1} \times e^{(b_{j,2} \times A)}\right)\right] \quad (7)$$

$$A_{min} \leq A \leq A_{max}$$

The optimal preload value of the X-axis screw of the vertical machining center can be obtained as 156°.

The invention claimed is:

1. A method for determining a preload value of a screw based on thermal error and temperature rise weighting, wherein, firstly, under a different preload states of the screw, a thermal behavior test of a feed shaft under typical working conditions is carried out to obtain a maximum thermal error and a temperature rise at a key measuring points in each preload state; then, a mathematical model of the preload values of the screw and the maximum thermal error is established and, meanwhile, a mathematical model of the preload value of the screw and the temperature rise at the key measuring points is also established; finally, a optimal preload value of the screw is obtained by optimizing a weighting function of the maximum thermal error and the temperature rise at each measuring point as an objective function; specific steps are as follows:

first step is a thermal behavior test of the feed shaft under typical working conditions;

a first temperature sensor is located on a front bearing of a feed system, a second temperature sensor is located on a nut, a third temperature sensor is located on a rear bearing of the feed system, and a fourth temperature sensor is located on a bed near the screw;

a motion trajectory of a machine tool is analyzed when machining workpieces, and a motion information of the feed shaft is extracted, including a travel range, a feed speed and a running frequency;

in a different preload states of the screw, the preload value of the screw is measured by a preload angle of the preload nut, and a thermal behavior test of the feed shaft is performed: in an initial thermal steady state, a full-range positioning error of the feed shaft is measured by a laser interferometer, and a temperature value of the first temperature sensor, the second temperature sensor, the third temperature sensor and the fourth temperature sensor are recorded; the feed shaft is heated under a motion process, and the full-range positioning error of the feed shaft and a temperature of each measuring point under the motion process is tested regularly, that is a testing process and it stop until the screw reaches thermal balance;

second step is to calculate the maximum thermal error of the feed shaft and the temperature rise at the key measuring points;

based on the temperature value collected in the first step, the maximum thermal error of the feed shaft is calculated according to equation (1) for each preload condition: thermal error of the feed shaft is calculated according to equation (1) for each preload condition:

$$E_{max\_i} = E_i(M_i, N) - E_i(1, N) \quad (1)$$

where: $E_{max\_i}$ is the maximum thermal error when an ith preload value is used; $M_i$ is a number of positioning error tests when the ith preload value is used; N is a number of points for the positioning error test; $E_i(M_i, N)$ is a Nth point data of a $M_i$th positioning error test when the ith preload value is used; $E_i(1,N)$ is the Nth point data of a first positioning error test when the ith preload value is used;

the temperature rise of each measuring point under each preload value is calculated according to equation (2):

$$\Delta T_{i,j} = [T_{i,j}(M_i) - T_{i,j}(1)] - [T_{i,4}(M_i) - T_{i,4}(1)] \quad (2)$$

wherein: $\Delta T_{i,j}$ is the temperature rise of a jth temperature sensor when an ith preload value is used; $T_{i,j}(M_i)$ is a $M_i$th measurement value of the jth temperature sensor when the ith preload value is used; $T_{i,j}(1)$ is a first measurement value of the jth temperature sensor when the ith preload value is used; $T_{i,4}(M_i)$ is the $M_i$th measurement value of the fourth temperature sensor when the ith preload value is used, and $T_{i,4}(1)$ is a first measurement value of the fourth temperature sensor when the ith preload value is used;

third step is to establish a mathematical model of the preload values of the screw and the maximum thermal error and another mathematical model of the preload values of the screw and the temperature rise at the key measuring points;

a relationship between the preload value of the screw and the maximum thermal error of the feed shaft is as shown in equation (3):

$$E_{max} = a_0 - a_1 \times A \quad (3)$$

where: $E_{max}$ is the maximum thermal error of the feed shaft, A is the preload value of the screw, that is, a locking angle of the preload nut, and $a_0$ and $a_1$ are coefficients;

a mathematical model of the preload value of the screw and the temperature rise of the jth temperature sensor is shown in equation (4):

$$\Delta T_j = b_{j,0} + b_{j,1} \times e^{(b_{j,2} \times A)} \quad (4)$$

where: $\Delta T_j$ is the temperature rise of the jth temperature sensor, and $b_{j,0}$, $b_{j,1}$, and $b_{j,2}$ are coefficients;

according to the maximum thermal error and temperature rise data of the screw under different preload values obtained in the second step, the coefficients $a_0$, $a_1$, $b_{j,0}$, $b_{j,1}$, and $b_{j,2}$ in formula (3) and formula (4) are identified by a least squares method;

fourth step is to calculate the optimal preload value of the screw;

the weighting functions of the maximum thermal error and temperature rise at key measuring points are shown in equation (5):

$$F(E_{max}, \Delta T_j) = \lambda_0 \times E_{max} + \sum_{j=1}^{3} \lambda_j \Delta T_j \quad (5)$$

where: $\lambda_0$ is a weight coefficient of the maximum thermal error of the feed shaft, and $\lambda_j$ is a weight coefficient of the temperature rise of the jth temperature sensor;

rewriting equation (5) according to equations (3) and (4) gives:

$$F(A) = \lambda_0 \times (a_0 - a_1 \times A) + \sum_{j=1}^{3} \lambda_j \left( b_{j,0} + b_{j,1} \times e^{(b_{j,2} \times A)} \right) \quad (6)$$

through automatic optimization based on equation (7), the optimal preload value of the screw can be obtained;

$$\min[F(A)] = \min \left[ \lambda_0 \times (a_0 - a_1 \times A) + \sum_{j=1}^{3} \lambda_j \left( b_{j,0} + b_{j,1} \times e^{(b_{j,2} \times A)} \right) \right] \quad (7)$$

$$A_{min} \leq A \leq A_{max}$$

where: $A_{min}$ and $A_{max}$ are a lower and upper limits of the preload value A of the screw respectively in the automatic optimization process.

\* \* \* \* \*